US009145317B2

(12) United States Patent
Ganter Parga

(10) Patent No.: US 9,145,317 B2
(45) Date of Patent: Sep. 29, 2015

(54) LIMITED VOLUME WASTE WATER SBR TREATMENT SYSTEM AND PROCESS

(76) Inventor: Edmundo Ganter Parga, Santiago (CL)

( * ) Notice: Subject to any disclaimer, the term of this patent is extended or adjusted under 35 U.S.C. 154(b) by 87 days.

(21) Appl. No.: 13/814,126

(22) PCT Filed: Aug. 4, 2011

(86) PCT No.: PCT/CL2011/000045
§ 371 (c)(1),
(2), (4) Date: Apr. 15, 2013

(87) PCT Pub. No.: WO2012/016347
PCT Pub. Date: Feb. 9, 2012

(65) Prior Publication Data
US 2013/0206686 A1      Aug. 15, 2013

(30) Foreign Application Priority Data

Aug. 4, 2010   (CL) .................................... 832-2010

(51) Int. Cl.
*C02F 3/12*       (2006.01)
*C02F 3/22*       (2006.01)
(52) U.S. Cl.
CPC ............. *C02F 3/1263* (2013.01); *C02F 3/1247* (2013.01); *C02F 3/22* (2013.01); *C02F 2209/005* (2013.01); *C02F 2209/42* (2013.01)
(58) Field of Classification Search
USPC ................. 210/150–151, 172, 220, 620, 744, 210/138–139
See application file for complete search history.

(56) References Cited

U.S. PATENT DOCUMENTS

| 5,395,527 | A | 3/1995 | Desjardins ..................... 210/608 |
| 5,853,589 | A | 12/1998 | Desjardins et al. ........... 210/605 |
| 6,494,608 | B1 * | 12/2002 | Retamal et al. ............... 366/132 |

FOREIGN PATENT DOCUMENTS

| EP | 0 997 441 A2 | 5/2000 |
| GB | 2 364 528 A | 1/2002 |
| WO | WO 2008/040261 A1 | 4/2008 |

OTHER PUBLICATIONS

R. Poltak, "Sequencing Batch Reactor Design and Operational Considerations," New England Interstate Water Pollution Control Commission, Sep. 2005, 28 pages, http://www.neiwpcc.org/neiwpcc_docs/sbr_manual.pdf.

*Primary Examiner* — Chester Barry
(74) *Attorney, Agent, or Firm* — Fitzpatrick, Cella, Harper & Scinto

(57) ABSTRACT

This invention refers to a single household waste water treatment plant, based on the SBR principle that uses two tanks, one storage tank (1) and one SBR (2), allowing the significant reduction of size, and in consequence, a low consumption of power, as well as the reduction of transportation volume when several units are transferred, wherein said storage tank (1) and said SBR (2) consist of one truncated cone shape external tank and one internal tank, also with truncated cone shape, wherein the internal tank has lower diameters than the external tank, wherein bases of both tanks are concentric, upon which both tanks generate two volumes, an internal volume that corresponds to the SBR (2), and one external volumetric ring, that will correspond to the storage tank (1); wherein the SBR has in its aeration zone duct (7) supported on legs (12), wherein such duct (7) consists of a truncated cone shaped base (13), in which upper part protrudes a cylinder (14), that will extend to the minimum level and that contains some devices inside that help breaking coalescence of air bubbles, and also print a rotational direction to the upward flow inducing to a higher oxygen capturing rate conducted by biology reducing thus power consumption. On the other hand, on the bottom part of the tank, the lower shape of the duct facilitates the suspension of solids as the downward flow is directed to tank edges as a result of the addressing induced by the lower cone of the duct, which also contributes to reduce the power spent in aeration for mixing purposes (21).

7 Claims, 3 Drawing Sheets

LIMITED VOLUME WASTE WATER SBR TREATMENT SYSTEM AND PROCESS

FIELD OF THE INVENTION

This invention relates to a domestic waste water treatment plant operated by the system known as SBR (Sequencing Batch Reactor), allowing: a) significant size reduction, and therefore low energy consumption, b) control of the automatic sludge age parameter; and c) reduction of transport volume when several units are transported. These objectives are met using 1) a method to establish sludge age on a simple, accurate, and automatic basis; 2) a device inside the aeration compartment inducing a required hydraulic condition for biology to adopt the aerobic macro granulation condition; 3) a geometry of the tank and its internal divisions, allowing it to be transported disassembled with optimum use of volume; 4) an excess flow detection system allowing the software to respond to this situation, altering original programming, starting short settling and drain periods, one or more, until overcoming the emergency. The need to handle peak flows is usually solved increasing the reactor volume; in this system, the reactor volume is around half such conventionally used; and 5) an alternative piping system that allows proper operation of the emergency program through excessive flow without losing reactor biology. This invention controls sludge age automatically, as well as forming an excellent floc, and aerobic macro granulation is generated whenever volumetric organic load is high. In addition, the reactor has a reduced volume.

BACKGROUND OF THE INVENTION

Domestic type and size waste water treatments using SBR are known, being the most widely used embodiment in Germany.

The prior art provides several references of process operating with SBR systems, such as, document WO 95/09130 (Timpany) dated Apr. 6, 1995, disclosing a process for water and waste water treatment with substantially constant biological content, which would allow for an efficient waste water treatment, combining the advantages and removing disadvantages of both activated sludge and SBR processes. In this case, waste water flows continuously in one direction through a plurality of hydraulically connected treatment cells in series. Waste water is subject to biological treatment in at least one of the cells, and is housed in at least a last treatment and discharge cell, immediately before the system discharge. In subsequent steps, waste water can continue in order to be fed into the system, in the same location while the last cell is temporarily closed. The mixture aeration device is diverted there to resuspend housed mixture liquor suspended solids and provide additional treatment. A transfer pump is diverted there to transfer suspended solids in the mixture liquor and the partially treated waste water, jointly mixed back to a previous treatment cell, and when completing the transfer step, the mixture aeration device is diverted until allowing accommodation of biological solids before treated waste water discharge on a continuous basis. Mixed liquor suspended solids flow in the same general direction as the waste water, but it always receives at least partial retrotransfer up to a previous treatment cell, accommodating and separating remaining solids coming from waste water before the treated waste water discharge from the last cell. In addition, continuous discharges are included and constant level operation on an essentially full basis through use of two discharge cells alternatively, and treatment of soluble pollutants and particulate matter, as well as biological removal of nitrogen and phosphorus.

The document EP 0834474 (Holm) dated Jun. 13, 2001, describes a procedure for discontinuous waste water purification according to the activated sludge procedure, wherein the cycle strategy for SBRs provides at least two internal cycles. The first internal filling with supernatant is made from a storage tank preferably to obtain a biological P redisolution. Last internal fillings are made with sediment, preferably in order to produce denitrification. This procedure is characterized in that waste water from an intermediate tank, that can be used for splitting raw water and is fitted with a circulation device, is transported to at least an SBR with at least two internal cycles; during the stage consisting of filling the first internal cycle or the first internal cycles, a previously treated waste water that produces a little loaded surplus is transported from the intermediate tank to the SBR; at least during the last total cycle filling stage, an essentially lower amount of waste water substantially concentrated as a sediment is transported from the intermediate tank to the SBR; with circulation stopped, previously reclaimed waste water is extracted from the upper part of the intermediate tank; with circulation in operation, concentrated was water is taken from the intermediate tank, dragging a high sediment content, or concentrated waste water is obtained from the bottom of the intermediate tank, resulting thus in transport of almost exclusively sediment (eventually with a certain amount of surplus); and the amount of nitrate to be denitrified after the first or penultimate cycle is estimated directly or indirectly; this is used to estimated the amount/class of concentrated waste water for the last internal cycle. In this procedure, the filling stage and also eventually the subsequent pure circulation stage of the first internal cycle are used for biological removal of P, and the necessary duration of this stage is controlled/regulated by the corresponding meter device.

In general terms, the single household SBR systems consist of a tank divided into two parts, the first is intended to be used as a storage tank (also known as a lung tank), which is used to store domestic effluent until the time comes to load it into the aerated SBR (second part). In conventional systems, both the storage tank and the aerated SBR aeration compartment are simply built in bigger sizes in order to prevent overflows, resulting in higher construction costs, transport costs, and subsequent operation cost, because higher consumption of electric power is needed for air pumping in order to keep biological sludge in suspension. The system is commanded by a PLC that inalterably marks times of the main SBR process stages, such as, 1) charging the affluent into the SBR, 2) aeration of the SBR, 3) biology settling, 4) removal of supernatant clarified liquid, and 5) bleeding excessive sludge sending it back to the storage tank aeration compartment. Therefore, the conventional system does not include any function generated by any type of sensor that measures a variable, specially the level, and temporarily alters the initial logic program in order to obtain higher process efficiency. Prior art is well-known and can be found in the websites of many German and Austrian companies, such as, www.p-wn.at; www.zapf-abs.de; www.graf-online.de In single household SBR systems and in single household systems in general, the sludge age parameter does not have control mechanisms, due to which an amount of sludge lower than the production rate is removed, increasing thus the amount of sludge, also increasing the sludge age. This results in the loss of proper floc formation properties and therefore good settling capacity, often reaching the less desired condition, which is proliferation of filamentous sludge.

In addition, as a consequence of large reactor volumes used in currently used systems, very low food/microorganism ratios (F/M) are used, resulting in sludge with low settling and stability conditions, requiring an hour to settle, which on one hand reduces time available to add an additional operation cycle per day, and on the other hand does not allow approaching aerobic macro granulation (having low sludge volumetric indexes, around 30 ml/gr), or directly prevents such desirable condition, which is maximum reach of the field technique of on site selection of activated sludge microorganisms, with multiples operational advantages. Note that aerobic macro granulation is a sludge property only given by SBR systems. As a general optimization concept, it is always desirable that all processes are carried out in the smallest possible reactor, which would result in lower manufacture costs, as well as in transport and installation savings, and lower subsequent operation costs.

The geometry of currently used reactors does not allow transporting a large number of units in economic terms, because they cannot be transported one inside the other due to their internal divisions.

Currently used systems used not have a system allowing them reacting in case of emergency for excessive flow, different from simple overflow implying loss of biology by dragging. Therefore, in case of emergency, the do not have a partial evacuation system in small amounts of partially treated effluent, but making sure that biology is not lost.

BRIEF DESCRIPTION OF THE INVENTION

This invention refers to a SBR type domestic waste water treatment system, which has a reduced size of around half such of conventional systems, which uses two tanks, a storage tank and an SBR, which once assembled are located concentrically, allowing reducing transport volume when several units are transported, one inside the other, in which such storage tank and such SBR consist of a truncated cone shaped external tank, and a truncated cone shaped internal tank, wherein the internal tank has lower diameters than the external tank, wherein both tank bases are concentric, generating both tanks two volumes, an internal volume that corresponds to the SBR, and an external volumetric ring, that will correspond to the storage tank; wherein the SBR has in its aeration zone a duct supported by legs, wherein such duct consists of a truncated cone shaped base, in which upper part protrudes a cylinder, that will extend to the minimum level (21); and control means consisting of: (a) an air lift pump that charges the untreated effluent from the storage tank into the SBR; (b) an air lift pump that discharges the treated effluent; (c) an emergency air lift pump that discharges when overflow is detected in the SBR; (d) an air lift pump that discharges excess sludge from the SBR to the storage tank; (e) an air diffuser located at the center of the SBR; (f) overflow detection means; and (g) a pneumatically-operated electric board. This invention also refers to a process for detection and drain of excess of flow without losing biology in the SBR, and a process for establishing sludge age in an SBR allowing keeping sludge age stable on a simple, accurate and automatic basis.

BRIEF DESCRIPTION OF THE DRAWINGS

Drawings attached hereto are solely included to provide better understanding of the invention, are added and are a part of this description, they illustrate one of the invention embodiments, and together with the description are used to explain the principles of this invention.

DETAILED DESCRIPTION OF THE INVENTION

Figure 1:
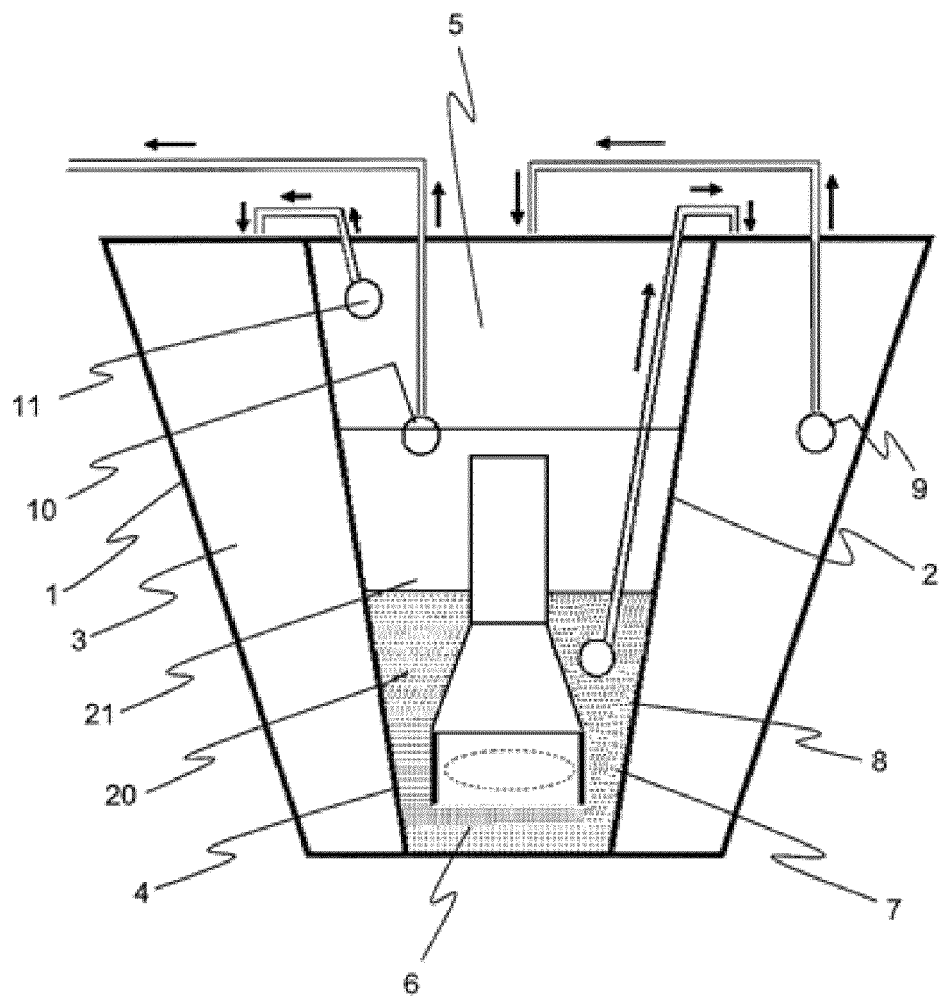
FIG. 1: shows a schematic view of the double tank that comprises the storage tank compartment and the SBR.
Figure 2:
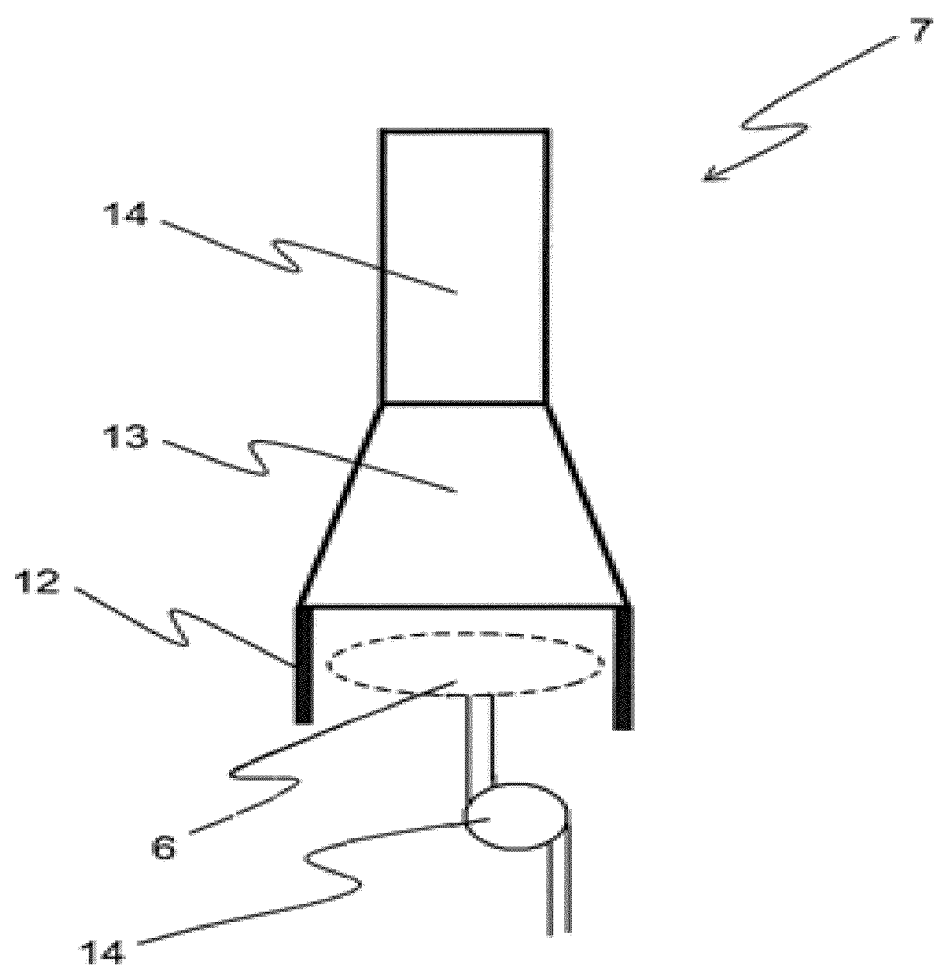
FIG. 2: shows a schematic view of the duct used in the aeration zone.
Figure 3:
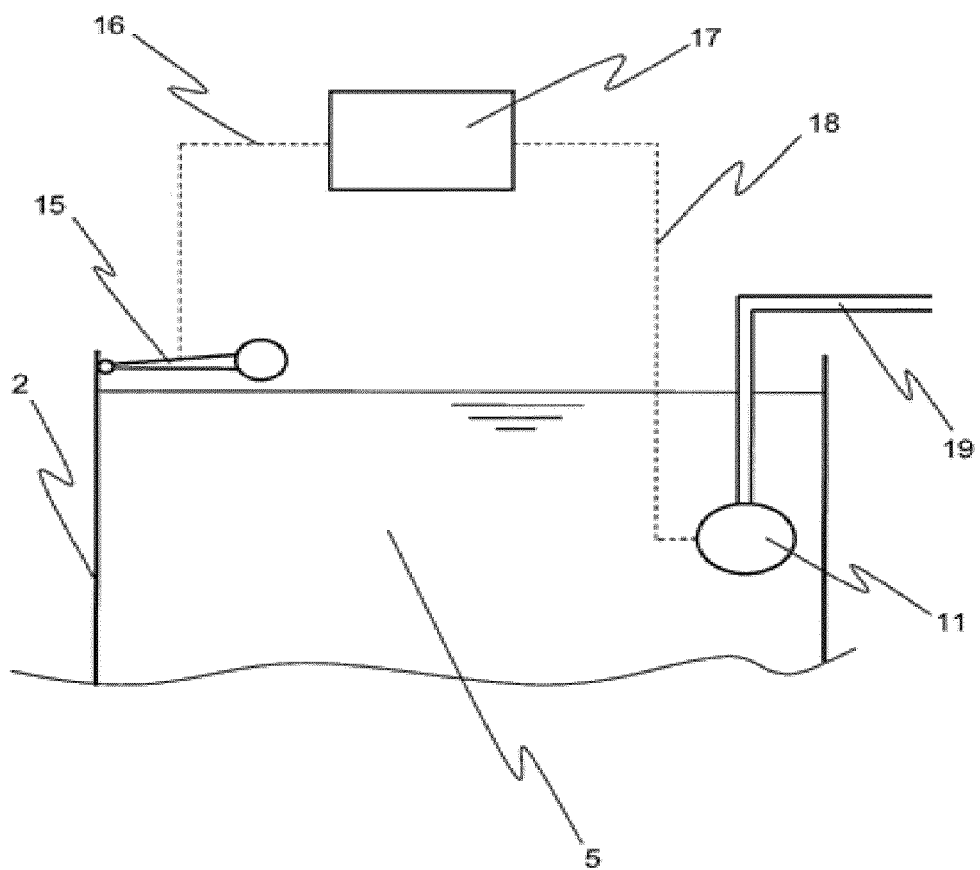
FIG. 3 shows a schematic view of the overflow detection means.

This invention refers to a domestic waste water treatment plant operated by the system known as SBR (Sequencing Batch Reactor), allowing: a) significant size reduction, and therefore low energy consumption, b) automatic control of the sludge age parameter; and c) reduction of transport volume when several units are transported; d) a system allows reacting in case of sudden flow increase avoiding loss of biology. These objectives are met through 1) a device located inside the aeration compartment inducing the hydraulic condition required by biology to adopt the aerobic macro granulation condition, obtaining thus a reactor size reduction, and lower energy consumption; 2) a simple, accurate, and automatic method to establish sludge age; 3) geometry of the tank and its internal divisions allowing disassembled transport with optimum use of volume; 4) an excess flow detection system slowing the software to respond in case of this situation by altering original programming, starting short settling and drain periods, one or more, until overcoming the emergency. The need to handle peak flows is usually solved increasing the reactor volume; in this system, the reactor volume is around half such conventionally used; and 5) an alternative piping system that allows proper operation both of the emergency program through excessive flow without losing reactor biology, and of the automatic sludge age control.

Problems detected in the prior art are solved by this invention in accordance with the following processes and equipment.

In the first place, this invention consists of a process that automatically controls sludge age, and also allows forming an excellent floc; and aerobic macro granulation is also generated when volumetric organic load is high.

This result is obtained as follows: excess sludge is removed at the beginning of one of daily cycles, i.e., when clarification drainage has been completed reason why water level inside the reactor is at its minimum fixed level (22). A first aeration stage takes place before removal in order to ensure that liquor is homogenized, i.e., that is has liquor mixture characteristics. Following such mixture aeration period comes a second stage in which air is directed to the sludge drain air lift pump blower, which construction is such that the pipe that causes suction shutoff effect is located at such height that it allows reducing liquor mixture level in only $\frac{1}{10}$ to $\frac{1}{12}$ of the minimum operation level height. The process then follows with the stage consisting of removing $\frac{1}{10}$ to $\frac{1}{12}$ of the reactor volume to a minimum level, with which $\frac{1}{10}$ to $\frac{1}{12}$ of sludge as liquor mixture is being removed, which automatically establishes sludge age in 10 to 12 days, according to the formula $$Q_w = \frac{V}{SRT}$$

wherein $Q_w$ is the sludge flow drained from the aerated reactor; V is the volume of the aerated reactor and SRT means Age of Sludge. The value from 10 to 12 days is the value specially recommended because it allows the development of nitrification biology, in spite it is a young sludge, with good flocculation and settlement properties, being also the optimal age of sludge to obtain macro granulation under stable conditions (avoiding proliferation of filamentous bacteria).

The possibility to reduce the volume of the SBR is directly associated to the need to conduct a higher number of cycles per day (ideally 5), which in turn results in the obtention of a sludge of very good settling (volumetric index of sludge lower than 50 ml/gr), that allows to operate with times of sedimentation times between 10 and 30 minutes (it must be considered that low times of sedimentation by themselves select colonies of micro organisms that sediment better), leaving free time to incorporate the fifth cycle of operation, ensuring a treatability of a higher daily flow. In order to achieve a volumetric index of sludge as the one indicated above, the SBR system must not only be operated with a filling at the beginning of the of the cycle and with no more load until the next cycle, generating a condition of abundance and further food shortage inducing to an improved settling, but also, making use of a device or duct, which is place inside the aeration zone and that induces to an hydraulic acceleration required by biology so that it adopts the condition of macro aerobic granulation. This device consists of a metallic duct (7) supported on legs (12); which has a conical trunk base (13), on which upper portion emerges the cylindrical body (14) of the duct. Said duct (7) prolongs until before the minimal height of operation of the SBR. This duct (7), the one that is placed on the air diffuser (6), is connected to a blower (15) that discharges at least effective 25 l/sec, reason why it produces an increase of the air speed until reaching 3.3 cm/sec, which is an adequate speed for the shutoff effect required to induce the aerobic macro granulation. In addition and as a consequence of the shutoff effect produced by the high lifting speed of the air bubble in the duct, the existing micro organisms increase their absorption rate of oxygen and, in consequence, their degradation of organic matter. Said cylindrical body (14) contains some devices inside that help breaking coalescence of air bubbles, and also print a rotational direction to the upward flow inducing to a higher oxygen capturing rate conducted by biology reducing thus power consumption. On the other hand, on the bottom part of the tank, the lower shape of the duct facilitates the suspension of solids as the downward flow is directed to tank edges as a result of the addressing induced by the lower cone of the duct, which also contributes to reduce the power spent in aeration for mixing (21) purposes.

In second term, the invention comprises a system, where the geometry that has originated the tanks conform the storage tank (1) and the SBR (2) allows the transport of several units under "one inside the other" conditions. This optimal transport situation of several units is achieved in this invention, as both the storage compartment (1) and the SBR (2) have a cone truncated shape, allowing that before its assembly, each of the two components are chartered under "one inside the other" conditions, achieving an effective saving in transport volume.

The system proposed to be able to operate in safe terms having a reduced volume, is equipped with an overflow detection means and an additional piping means, that allows the discharge of small quantities of water from inside of the SBR (2) without losing biology. The SBR (2) has an overflow sensor (16) that communicates through first communication means (17) with a processing media (18), which in turn, with second communication means (19), communicates with an emergency air lift pump (11), that evacuates the excess of water through piping (20). To conduct this operation, the invention proposes a process that comprises, a first stage that begins when the overflow sensor (16) works, the PLC suspends any program it is running, with which it is continued with a settling stage that settles in a range of 3 to 10 minutes and then, continues with the activation stage of the emergency air lift pump (11), which discharges during 3 to 10 minutes through the piping (20). The emergency air lift pump (11) differs from the air lift pump of normal discharge (10), where it has a higher suction point, reason why, in spite of initiating its suction after a very short settling periods, it has very few probabilities to drag biology, because suction is already in a zone of clarified liquid. The emergency operation could be repeated as many times as needed until one stage is generated, where the over flow sensor stops being activated. When this has happened, it continues with the final stage, where the general program returns to the point where it should be because of the schedule.

The system of this invention consists of:

1. Two cone truncated shape tanks, of the following referential characteristics:

a) One external tank with the following measures:

| | |
|---|---|
| Height | 1.70 (m) |
| Upper Diameter | 1.35 (m) |
| Lower Diameter | 1.30 (m) | b) One internal tank with the following measures:

| | |
|---|---|
| Height | 1.65 (m) |
| Upper Diameter | 0.95 (m) |
| Lower Diameter | 0.90 (m) |

The internal tank is fixed to the base of the external tank and both bases are concentric, with which two volumes are generated, one interior corresponding to the SBR (2) and one volumetric ring external with respect to it, that will correspond to the storage tank (1).

The system of the invention comprises four air lift pumps with its respective piping and control means destined each of them to the following functions:

a) An air lift pump (9) that charges the untreated effluent from a storage tank (1) into the SBR (2).

b) An air lift pump (10) that discharges the treated effluent (5).

c) An emergency air lift pump (11) that discharges when there is an overflow in the SBR (2).

d) An air lift pump (8) that discharges excess sludge (4) from the SBR tank to the storage tank.

e) An air diffuser (6) located at the center of the SBR (2)

f) An overflow detection means.

g) An electronically-operated electric board, connected to a blower that, commanded by a PLC, derivates air as scheduled to each of the air lift pumps or to air diffuser. From this condition, the plant operation is fully pneumatic.

The invention claimed is:

1. A waste water treatment SBR system, that uses two concentrical tanks, one storage tank (1) and one SBR (2), that allows a significant reduction of size, and in consequence, a low consumption of power, as well as a reduction of transport volume when several units are transferred, CHARACTERIZED in that:

said storage tank (1) and said SBR (2) include an external truncated cone shaped tank and an internal tank, also truncated cone shaped, wherein the internal tank has smaller diameters than the external tank, wherein both tank bases are concentric, generating both tanks two volumes, an internal volume that corresponds to the SBR (2), and an external volumetric ring, that will correspond to the storage tank (1);

wherein the SBR has in its aeration zone a duct (7) supported on legs (12), wherein such duct (7) includes a truncated cone-shaped base (13), in which upper part protrudes a cylinder (14), that extends to a height lower than the minimum operating height of the SBR; and a controller.

2. A waste water treatment SBR system according to claim 1, CHARACTERIZED in that said controller includes: (a) an air lift pump (9) that charges untreated effluent from the storage tank (1) into the SBR (2); (b) an air lift pump (10) that discharges treated effluent (5); (c) an emergency air lift pump (11) that discharges when overflow is detected in the SBR (2); (d) an air lift pump (8) that discharges excess sludge (4) from the SBR (1) to the storage tank (2); (e) an air diffuser (6) located at the center of the SBR (2); (f) an overflow detector; and (g) an electronically-operated electric board, commanded by a PLC, which according to previously set times or for a need of an emergency program, operates a plant pneumatically, deriving, according to the program, air flow of a blower through solenoid valves to any of the air lift pumps or to the air diffuser.

3. A waste water treatment SBR system according to claim 1, CHARACTERIZED in that legs (12) of said duct (7) locate on said air diffuser (6).

4. A waste water treatment SBR system according to claim 1, CHARACTERIZED in that an overflow sensor (16), connected through a first communicator (17) with a processor (18), which through a second communicator (19), is connected to said emergency air lift pump (11), which discharges excess of water through piping (20).

5. A waste water treatment SBR system according to claim 1, CHARACTERIZED in that said air diffuser (6) is connected to a blower (15) which discharges at least 25 l/sec.

6. A process to detect and discharge excess of flow without losing biology in the SBR (2), in a plant that uses a storage tank (1) and a SBR (2), CHARACTERIZED in that the process comprises stages to:
   (a) detect an overflow in said SBR (2) through the activation of an overflow sensor (16);
   (b) suspend a program being run through a PLC scheduled that operates said plant, where said storage tank (1) and said SBR (2) operate;
   (c) settle for a range of 3 to 10 minutes;
   (d) activate an emergency air lift pump (11) during 3 to 10 minutes through piping (20);
   (e) repeat stages (a) to (d) until stage (d) is generated, until the overflow sensor (16) stops being activated;
   (f) continue with a general program of the PLC disabled in stage (b), returning to a point where it should be because of the schedule.

7. A process to determine an age of sludge in a SBR, that allows in a simple, acute and automatic manner determining the age of sludge; CHARACTERIZED in that the process comprises stages to:
   (a) conduct an extraction of excess sludge at a beginning of one of daily cycle, when clarification drainage has been completed, reason why water level inside the SBR is at its minimum fixed level (22);
   (b) aerate a liquor until it is homogenized, namely, that it has characteristics of a mixture liquor;
   (c) derive blower air to an air lift pump of sludge discharge, which is at such a height that it allows lowering of a level of the mixture liquor in just $1/10$ to $1/12$ of a height of a minimal operation level;
   (d) remove $1/10$ to $1/12$ of a volume of the SBR to minimum level, with which $1/10$ to $1/12$ of sludge as liquor mixture is being removed, which automatically establishes the age of sludge in 10 to 12 days.

\* \* \* \* \*